US011148577B2

(12) United States Patent
Tsutsumi (10) Patent No.: US 11,148,577 B2
(45) Date of Patent: Oct. 19, 2021

(54) VEHICLE EXTERIOR PANEL PROVIDED WITH SENSORS

(71) Applicant: Koito Manufacturing Co., LTD., Tokyo (JP)

(72) Inventor: Yasuaki Tsutsumi, Shizuoka (JP)

(73) Assignee: Koito Manufacturing Co., LTD., Tokyo (JP)

( * ) Notice: Subject to any disclaimer, the term of this patent is extended or adjusted under 35 U.S.C. 154(b) by 0 days.

(21) Appl. No.: 16/649,006

(22) PCT Filed: Sep. 10, 2018

(86) PCT No.: PCT/JP2018/033488
§ 371 (c)(1),
(2) Date: Mar. 19, 2020

(87) PCT Pub. No.: WO2019/059026
PCT Pub. Date: Mar. 28, 2019

(65) Prior Publication Data
US 2020/0247307 A1    Aug. 6, 2020

(30) Foreign Application Priority Data

Sep. 20, 2017 (JP) .............................. JP2017-179977

(51) Int. Cl.
*B60Q 1/04* (2006.01)
*G01S 17/931* (2020.01)
(Continued)

(52) U.S. Cl.
CPC ............. *B60Q 1/0458* (2013.01); *B60Q 1/08* (2013.01); *B60R 11/04* (2013.01); *G01S 13/862* (2013.01);
(Continued)

(58) Field of Classification Search
CPC .......... B60Q 1/0458; B60Q 1/08; B60Q 1/04; G01S 17/931; G01S 13/862;
(Continued)

(56) References Cited

U.S. PATENT DOCUMENTS

2006/0157992 A1    7/2006  Sakamoto et al.
2011/0241376 A1*  10/2011  Igura ................... B62D 25/105
                                              296/146.3
2014/0347959 A1*  11/2014  Hirakawa .............. G01S 7/521
                                              367/140

FOREIGN PATENT DOCUMENTS

DE    103 16 344 A1    10/2004
EP     0 586 279 A1     3/1994
(Continued)

OTHER PUBLICATIONS

Partial Supplementary European Search Report issued for European Application No. 18858157.3 dated Apr. 26, 2021, 17 pages.

*Primary Examiner* — Kevin Quarterman
(74) *Attorney, Agent, or Firm* — Lewis Rice LLC (57) ABSTRACT

Problem: To enhance the accuracy of the information collected from around a vehicle by always keeping constant the relative positions of a plurality of sensors provided at different parts of a vehicle body.
Means to Solve the Problem: In a front module panel 11 provided to the front surface of a vehicle body, a panel body 12 is integrally molded by a synthetic resin material, a front grille portion 13 is provided at the center thereof, a front bumper portion 14 is formed below the grille portion, and a translucent cover portion 16 of a head lamp 15 is two-color molded by a transparent resin material at each of both right ends of the panel body 12. A camera is built in each of the head lamps 15, a millimeter wave radar 21 is mounted to an
(Continued)

emblem 17, a LIDAR 22 is built in each fog lamp 18, and ultrasonic sensors 23 are disposed near the lower edge of the front bumper portion 14.

9 Claims, 8 Drawing Sheets

(51) Int. Cl.
| | | |
|---|---|---|
| | *B60Q 1/08* | (2006.01) |
| | *B60R 11/04* | (2006.01) |
| | *G01S 13/86* | (2006.01) |
| | *G01S 13/931* | (2020.01) |
| | *G01S 15/931* | (2020.01) |
| | *G01S 17/87* | (2020.01) |

(52) U.S. Cl.
CPC .......... *G01S 13/865* (2013.01); *G01S 13/867* (2013.01); *G01S 13/931* (2013.01); *G01S 15/931* (2013.01); *G01S 17/87* (2013.01); *G01S 17/931* (2020.01); *G01S 2013/93275* (2020.01)

(58) Field of Classification Search
CPC .... G01S 13/865; G01S 13/867; G01S 13/931; G01S 15/931; G01S 17/87; G01S 2013/93275; G01S 13/86; G01S 13/93; G01S 15/93; G01S 17/93; B60R 11/04; B60R 16/02
See application file for complete search history.

(56) References Cited

FOREIGN PATENT DOCUMENTS

| | | | |
|---|---|---|---|
| JP | 1-127428 A | | 5/1989 |
| JP | 2005082036 A | * | 3/2005 |
| JP | 2006-199145 A | | 8/2006 |
| JP | 2013-164926 A | | 8/2013 |
| JP | 2013164926 A | * | 8/2013 |
| JP | 2017091321 A | * | 5/2017 |

* cited by examiner

VEHICLE EXTERIOR PANEL PROVIDED WITH SENSORS

CROSS REFERENCE TO RELATED APPLICATION(S)

This application is a § 371 U.S. National Phase of International Application Serial No.: PCT/JP2018/033488 filed Sep. 20, 2018, which is turn claims priority to Japanese Patent Application Serial No: 2017-179977, filed Sep. 20, 2017. The entire disclosure of all the above documents is herein incorporated by reference.

TECHNICAL FIELD

The present invention relates to a vehicle exterior panel for covering an external surface of a vehicle, and more particularly to a vehicle exterior panel provided with sensors for collecting information from around the vehicle.

BACKGROUND OF THE INVENTION

Generally, an automobile may travel safely based on the driver's accurate "cognition, judgment, and operation." Conventionally, in order to reduce misidentification by the driver, various types of technology have been proposed for collecting information from around a vehicle body with sensors and assisting safe driving of the vehicle based on the collected information. Additionally, in recent years, technologies have been proposed to improve the safety during autonomous driving by using a plurality of sensors to reduce the dependency on the driver.

For example, in the object detection apparatus described in Patent Literature 1, a radar transmitter-receiver unit is provided in a front grille portion at a front surface of a vehicle body, a camera and an information processing unit are mounted on a rear-view mirror, and the radar transmitter-receiver unit and the information processing unit are connected with a transmission line, the information processing unit being configured to detect the distance or the position of a nearby object with respect to the vehicle body based on the information collected by the radar and the camera.

PRIOR ART DOCUMENTS

Patent Literature

Patent Literature 1: Japanese Patent Laid-Open No. 2011-99683

SUMMARY OF THE INVENTION

Problem to be Solved by the Invention

According to the conventional technology, however, as a plurality of sensors, such as radars, cameras, etc., are installed in different parts of the vehicle body, if the position of the front grille portion changes relative to the rear-view mirror portion, for example, due to vibration or deformation of the vehicle body, problematically, the measurement results of the distance or the position based on the output signals of two sensors may change, thus adversely affecting the optical axes of the head lamps and the control of the actuation timing of the brake, etc.

In view of the above, one object of the present invention is to provide a vehicle exterior panel that can at all times keep constant the relative positions of a plurality of sensors provided in different parts of a vehicle body to improve the accuracy of the information collected from around the vehicle.

Means to Solve the Problem

In order to solve the above-identified problem, the present invention provides a vehicle exterior panel for covering an external surface of a vehicle. This exterior panel has a panel body integrally molded of a synthetic resin material. In addition, a first sensor and a second sensor for collecting information from around the vehicle body are arranged in different parts of a panel body integrally molded of a synthetic resin material.

The vehicle exterior panel of the present invention is not limited to any specific location of the external surface of the vehicle. For example, it can be applied to an exterior panel that covers a part or entire region of the front surface, the rear surface, either of the right and left sides, the top surface, or the bottom surface of the vehicle body. The entire panel body of the exterior panel can be integrally molded by injecting a molten synthetic resin material into the cavity of a set of forming molds.

In a preferred embodiment of the present invention, a vehicle lamp for illuminating surroundings of the vehicle is fixedly mounted to each of both ends of the panel body. To mount the vehicle lamps, for example, translucent cover portions of the vehicle lamps can be two-color molded of a transparent synthetic resin material on both ends of the panel body, and a body portion and a light source unit of each vehicle lamp can be assembled to the transparent part. Also, body portions of the vehicle lamps can be integrally molded on both ends of the panel body so as to allow a light source unit and a translucent cover portion to be assembled to each body portion. Alternatively, a body portion and a light source unit may be assembled to a lamp mounting portion integrally molded on each of both ends of the panel body.

According to some embodiments of the present invention, an ECU (electronic control unit) is built in each of the vehicle lamps so that information collected by the plurality of sensors can be processed quickly. Examples of what can be controlled by the ECUs may be an acceleration/deceleration device, a braking device, a display device, an alarm unit, vehicle lamps of the vehicle, etc. In preferred embodiments, the lamp ECUs mounted on the vehicle lamps are configured to control light outputs of the vehicle lamps, such as the on/off and the luminances, the orientations of the optical axes of the vehicle lamps, etc, based on the information collected by the first and second sensors. Additionally, they are configured to use the vehicle lamps to render images on road surfaces and to display information on a vehicle-mounted display that calls attention to pedestrians.

Moreover, as the vehicle lamps, being exterior equipment of a vehicle body, have high waterproof and dust-proof capabilities, either of the first and second sensors can be built in the housing of each of the vehicle lamps. In the case of an exterior panel that is provided on the front surface or the rear surface of the vehicle body, the first and second sensors can be separately built in a pair of right and left head lamps or rear combination lamps mounted on both ends of the panel body.

It should be noted that, according to the present invention, the first and second sensors are not limited to any specific types; for example, cameras, millimeter wave radars, light detection and ranging (LIDAR), ultrasonic sensors, magnetic sensors, etc., for detecting the location of an object around the vehicle body, the distance between the object and the vehicle body, the type of the object (a person, animal, baggage), the road conditions (unevenness, rain, snow, ice), the vehicle level, the tire air pressures, etc., may be used. Furthermore, the same type or different types of two sensors may be installed on two different locations, or three or more sensors may be installed on separate parts.

In one embodiment of the present invention, a vehicle exterior panel is used as an automotive front module panel. This front panel body includes, in its panel body, a front grille portion for covering the front surface of the vehicle body and a front bumper portion that extends in the direction of a vehicle width below the front grille portion. In another embodiment of the present invention, a vehicle exterior panel is used as an automotive rear door module panel. This rear door module panel includes, in the panel body, a rear door portion that openably and closably covers the rear surface of the vehicle body and a transparent rear window portion.

In particular, in the case of the rear door module panel, advantageously, the rear window portion is provided with a first region having a relatively high transmittance of visible light and a second region having a relatively low transmittance of visible light, the first sensor and/or the second sensor being attached to a cabin side of the second region. In this way, the darkness of the second region can not only hide the sensors from view from the outside but also limit the temperature rise in the second region due to sunlight to allow for the stable operation of the sensors. Moreover, in order to enhance the sensitivities of the sensors at night, etc., a thermochromism material, whose light transmittance changes due to the outside air temperature, may be used so that the light transmittance of the second region may be improved as the outside air temperature becomes lower.

Advantageous Effects of the Invention

According to the vehicle exterior panel of the present invention, there is provided an advantageous effect that, as at least two sensors are arranged in different parts of an integrally molded panel body, the relative positions of the sensors can be kept constant at all times to improve the accuracy of the information collected from around the vehicle.

DESCRIPTION OF EMBODIMENTS

Figure 6:
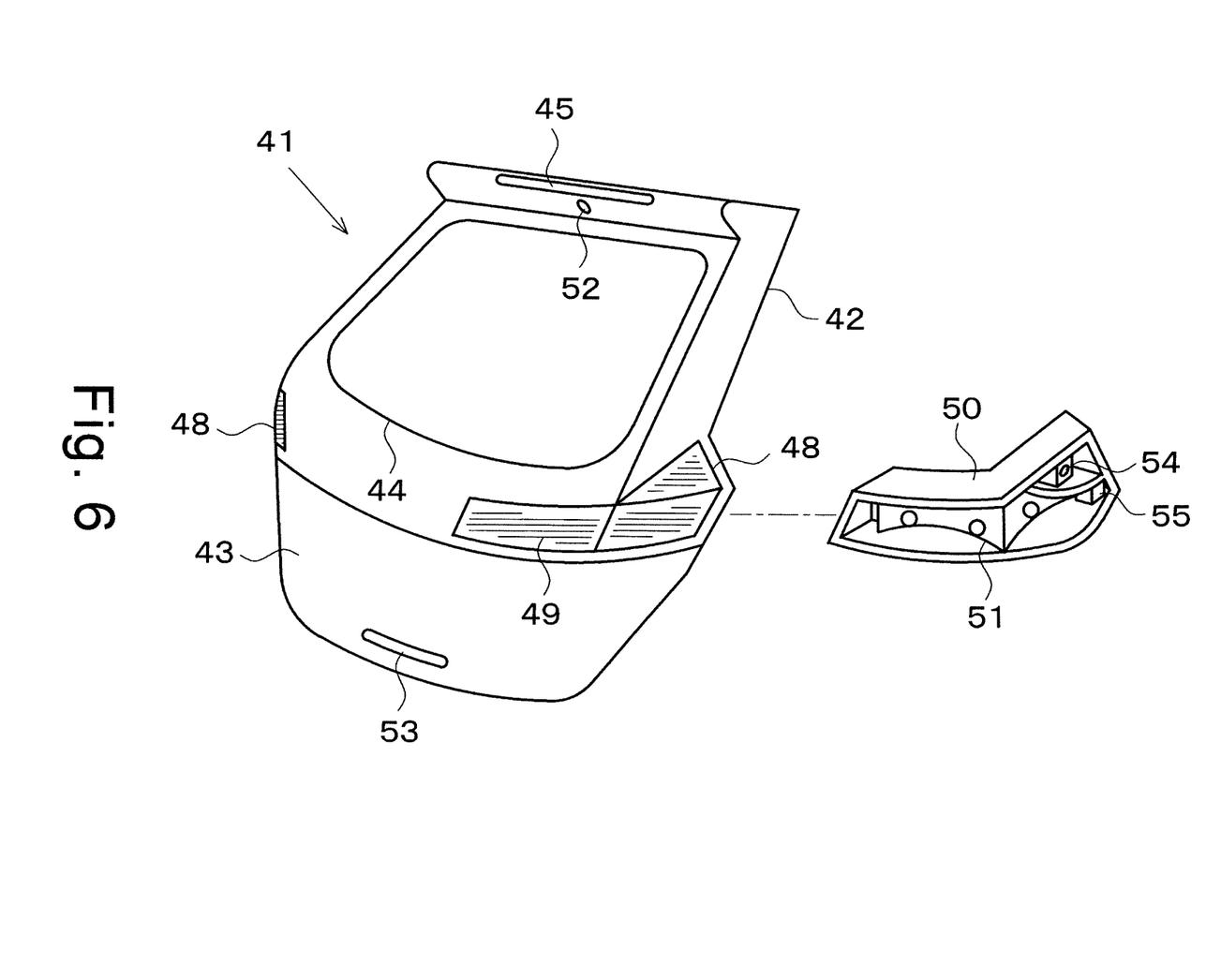
FIG. 6 is a perspective view of a rear door module panel, representing Embodiment 2 of the present invention.
Figure 7:
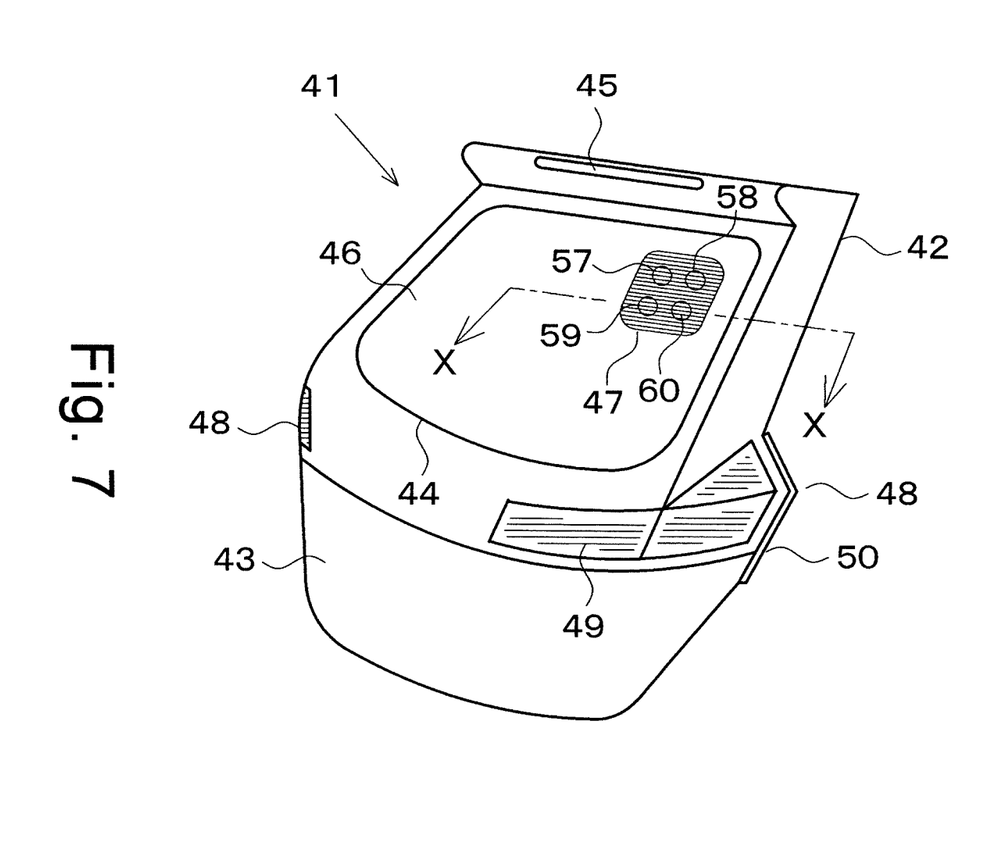
FIG. 7 is a perspective view of a panel in which a pigmented section is provided in a second region of a rear window portion.
Figure 8:
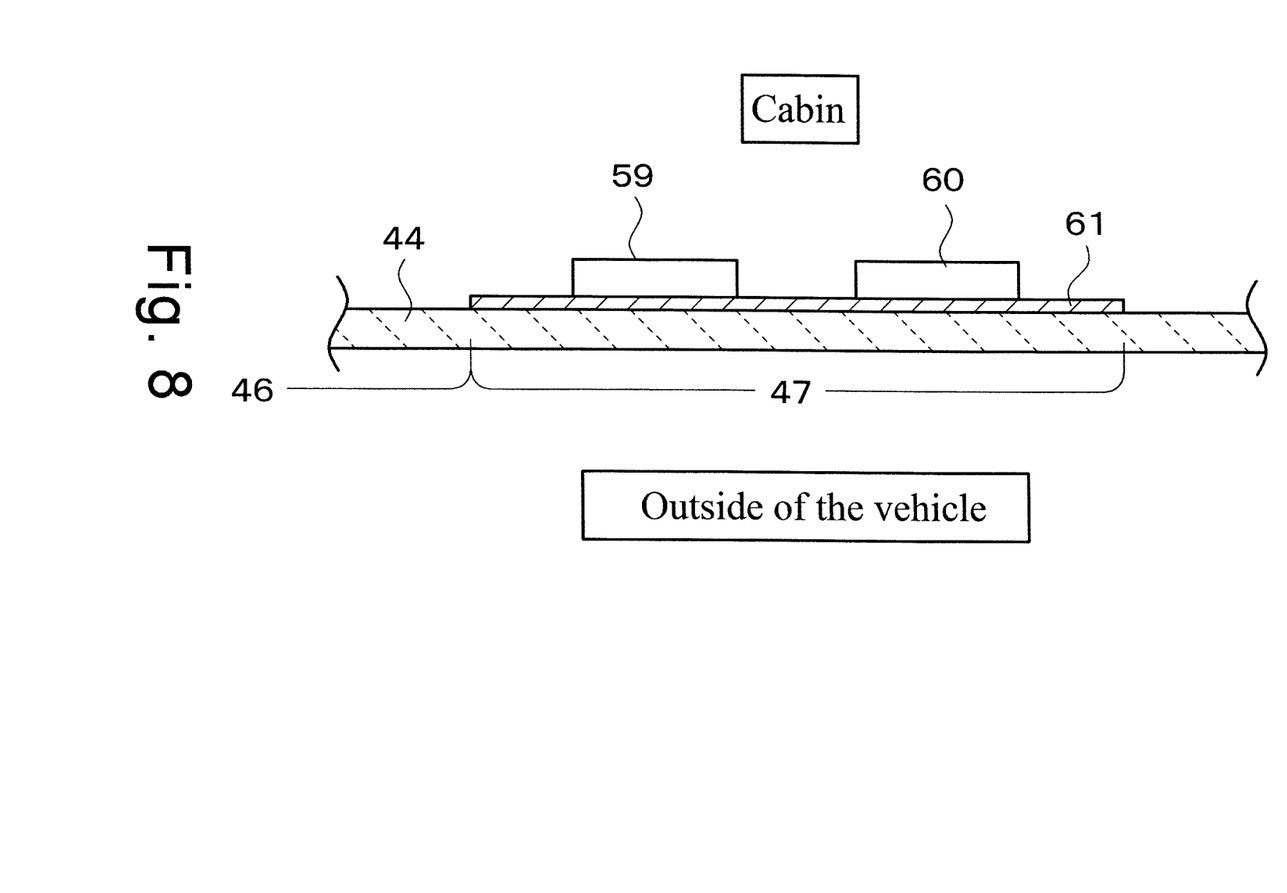
FIG. 8 is a cross-sectional view taken along Line X-X of FIG. 7.

Embodiments of the present invention will be described hereinafter with reference to the drawings. FIGS. 1-5 show Embodiment 1 in which the present invention is embodied as an exterior panel for an automobile. FIGS. 6-8 show Embodiment 2 in which the present invention is embodied as a rear door module panel for an automobile. In each of the views, common or identical symbols designate identical components.

Embodiment 1

Figure 1:
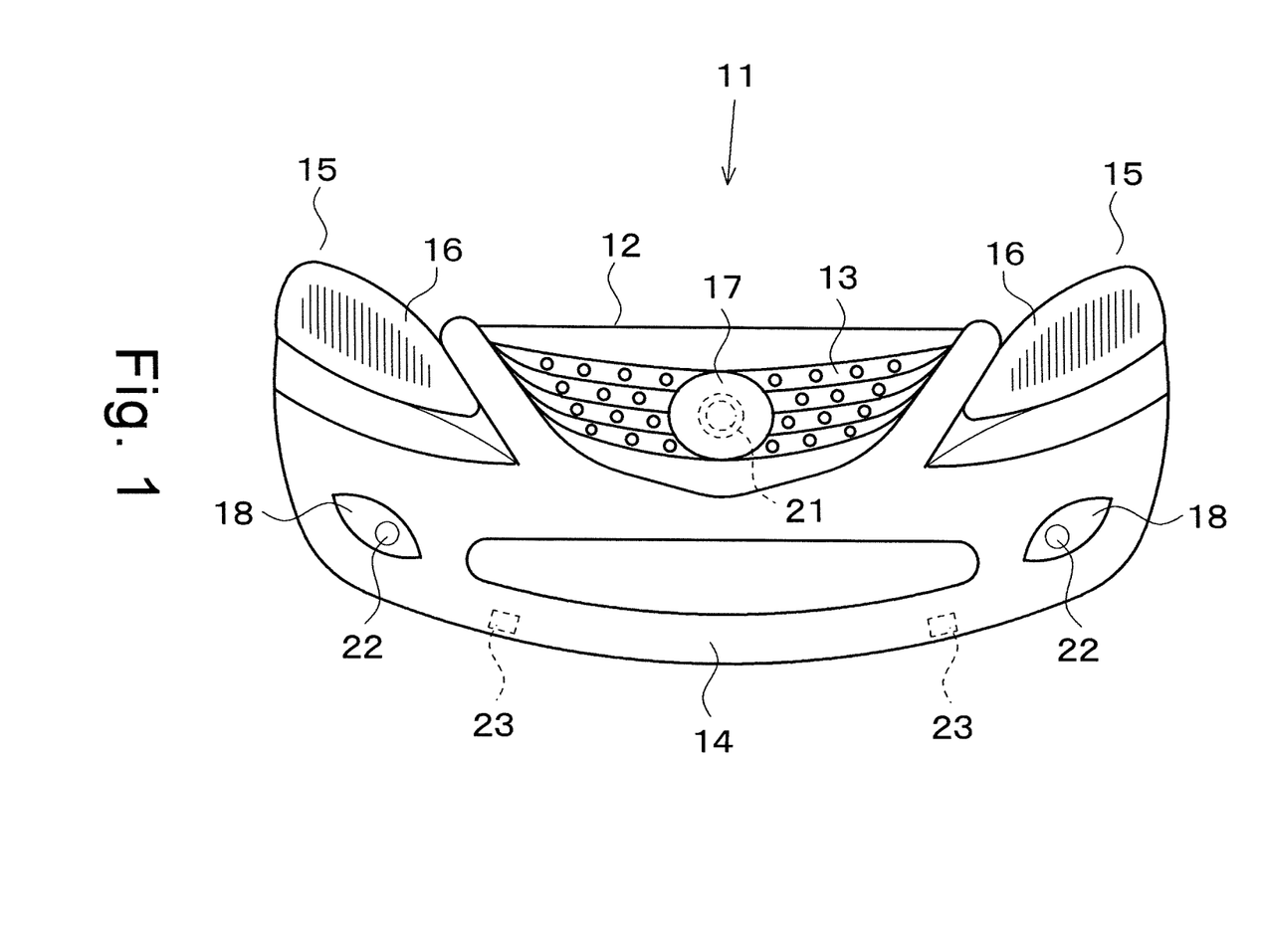
FIG. 1 is a front view of a front module, representing Embodiment 1 of the present invention.

As shown in FIG. 1, a front module panel 11 of Embodiment 1 is an exterior panel for being fitted to a front surface of a vehicle body and has a panel body 12 made of resin. The panel body 12 is integrally molded of a synthetic resin material that has a front grille portion 13 provided in the center portion thereof for covering the engine room of the vehicle body and also has a front bumper portion 14 formed to extend in the direction of the width of the vehicle below the front grille portion 13. A translucent cover portion 16 of a head lamp 15 is provided on each of both right and left ends of the front grille portion 13 and is two-color molded of a transparent resin material on the panel body 12. Moreover, an emblem 17 is provided in the center of the front grille portion 13 and a fog lamp 18 is provided on each of both right and left ends of the front bumper portion 14.

Figure 2:
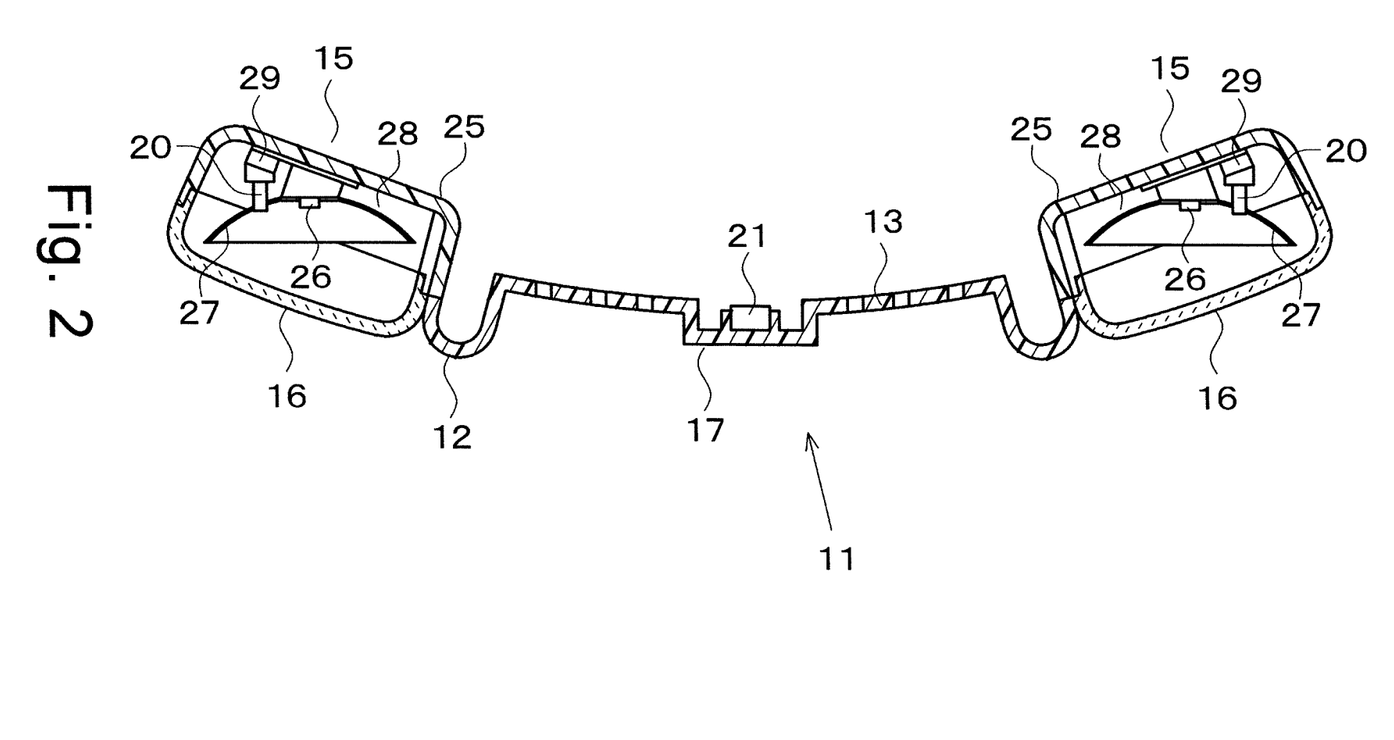
FIG. 2 is a horizontal cross-sectional view of the panel of FIG. 1.

As shown in FIG. 1 and FIG. 2, a plurality of sensors is arranged in different parts of the panel body 12 for collecting information from ahead of the vehicle body. In the illustrated example, a camera 20 is built in each of the right and left head lamps 15, serving as a first sensor for shooting the scene ahead of the vehicle body, a millimeter wave radar 21 is attached to the rear surface of the emblem 17, serving as a second sensor for detecting an object ahead, a LIDAR 22 is built in each of the fog lamps 18 for measuring the distance between an object ahead and the vehicle body, and ultrasonic sensors 23 are mounted near the lower edge of the front bumper portion 14 for detecting the road conditions and the tire air pressures. It should be noted that the numbers, the types, and the mounting parts of the sensors are not limited to the illustrated example and may be freely changed as required. In addition, in the case of an autonomous driving vehicle, the emblem 17 can be lit to serve as an indication lamp to signal autonomous driving.

Figure 3:
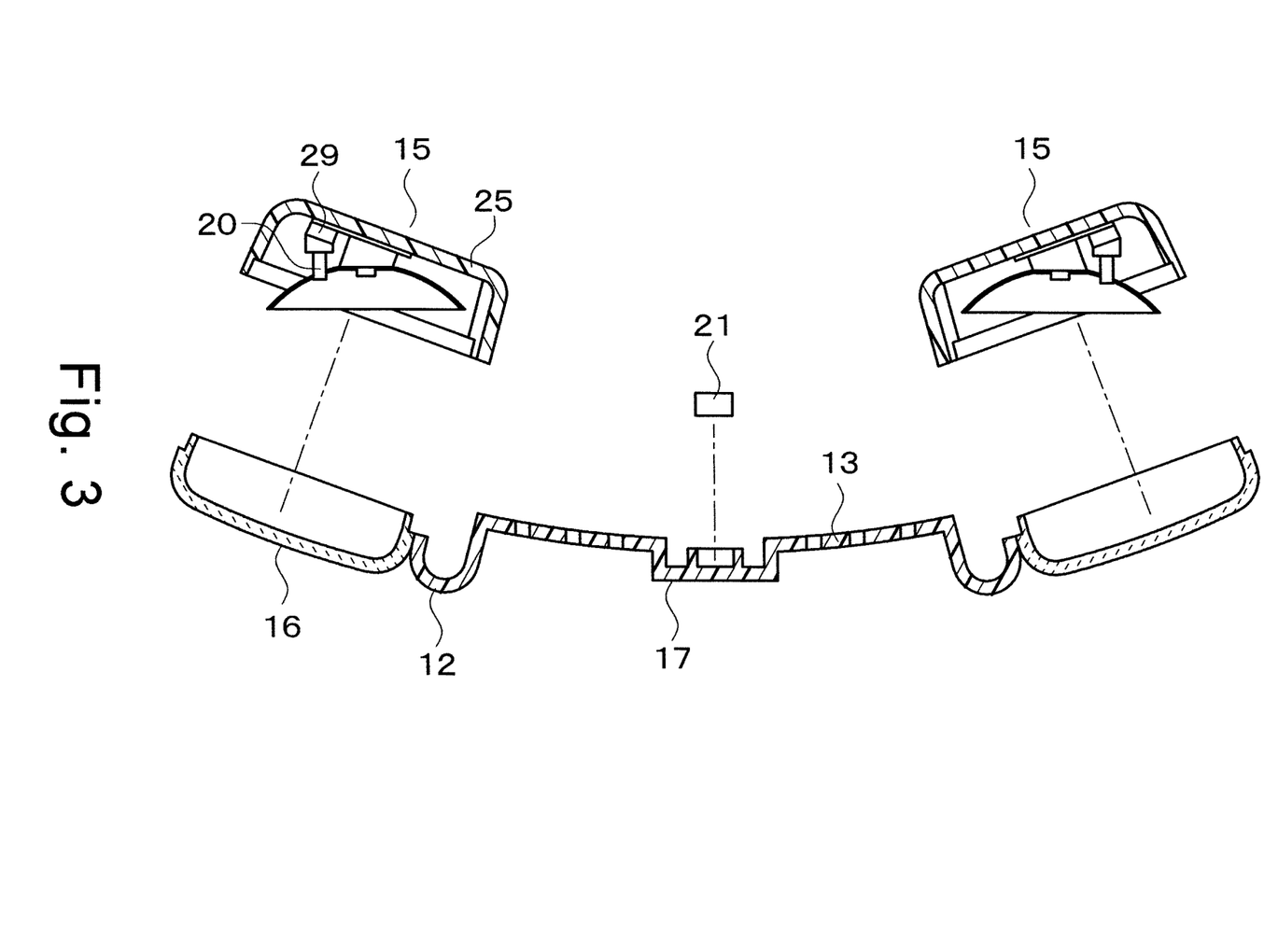
FIG. 3 is a cross-sectional view showing the panel in which translucent cover portions of head lamps are integrally molded on a panel body.

As shown in FIG. 2 and FIG. 3, a body portion 25 of each head lamp 15 is fixedly assembled to the translucent cover portion 16 of the panel body 12. Received inside of the body portion 25 is a light source unit 28 that has a light source 26, a reflector 27, etc., along with a vehicle lamp ECU 29 installed therein, and the vehicle lamp ECUs 29 are adapted to control, based on the information collected by each of the sensors 20-23, the light outputs of the head lamps 15, including the on/off and the luminances of the light sources 26, the orientations of the light source units 28, etc. Furthermore, part of the information collected by the sensors 20-23 is transferred from the vehicle lamp ECUs 29 to a vehicle ECU (not shown) to allow the vehicle ECU to control an acceleration/deceleration device, a braking device, a display device, an alarm unit, etc., of the vehicle.

Figure 4:
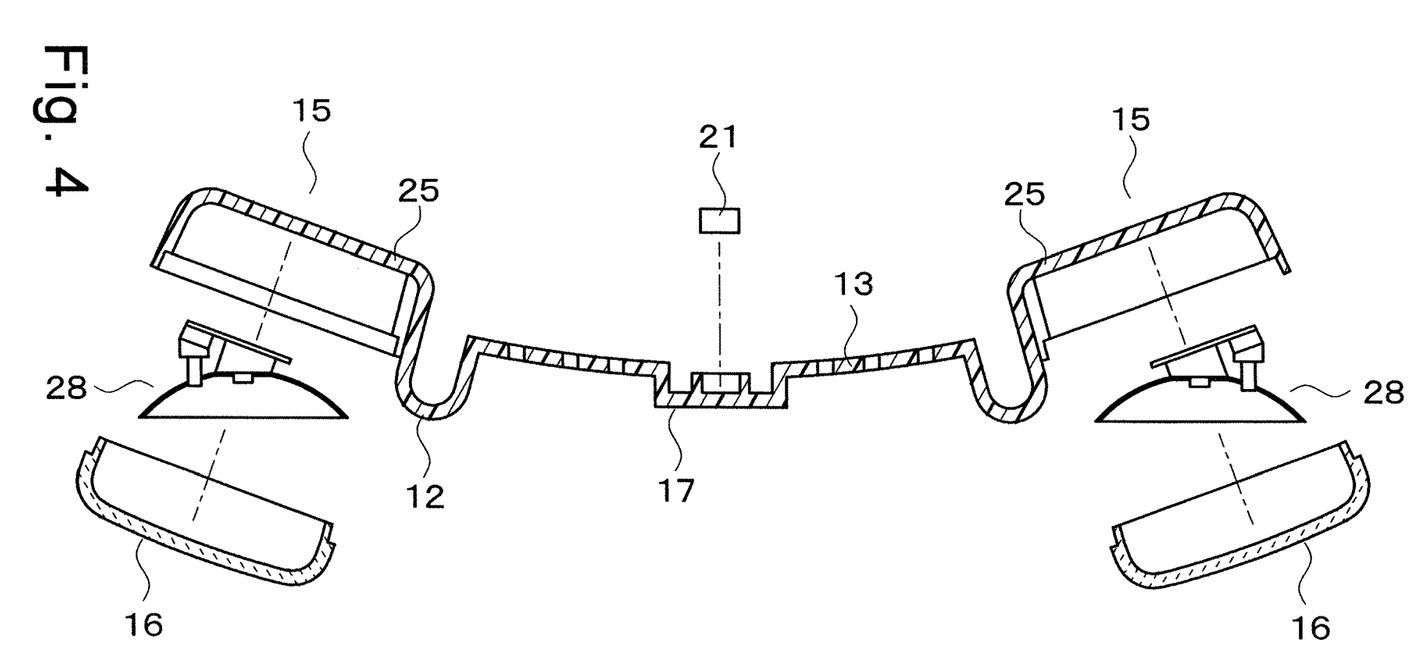
FIG. 4 is a cross-sectional view showing a panel in which body portions of the head lamps are integrally molded on the panel body.
Figure 5:
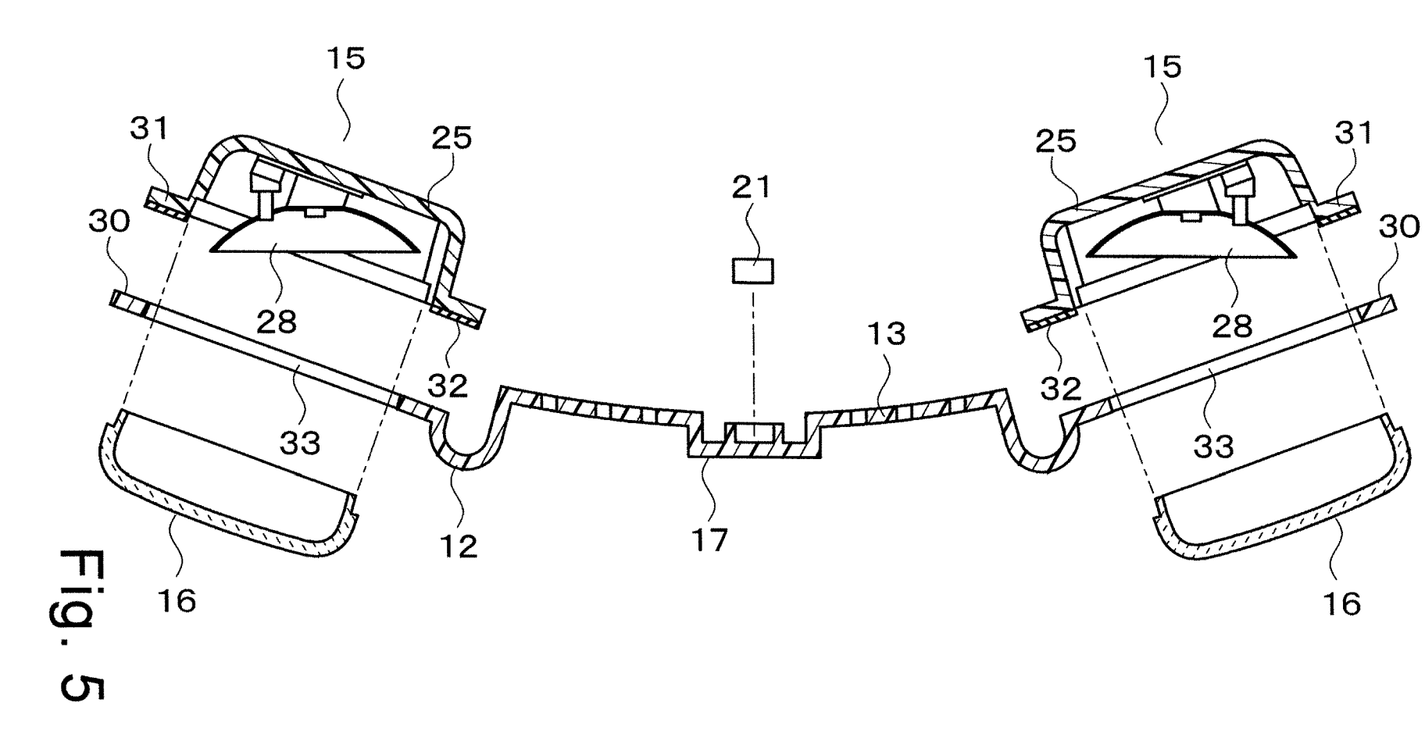
FIG. 5 is a cross-sectional view showing a panel in which head lamp mounting frames are integrally molded on the panel body.

FIG. 4 and FIG. 5 show an alternate assembly structure of head lamps 15. In the case of the head lamps 15 shown in shown in FIG. 4, during the molding of the panel body 12, a body portion 25 is integrally molded on each of both right and left ends of the panel body 12, and after the molding of the panel, a light source unit 28 is fixedly installed inside the body portion 25 while a translucent cover portion 16 is assembled to the front surface of the body portion 25. In the case of the head lamps 15 shown in shown in FIG. 5, during the molding of the panel body 12, a ring-shaped lamp mounting frame 30 is integrally molded on each of both right and left ends thereof, and after the molding of the panel, a flange portion 31 of each body portion 25 is fixedly mounted to the lamp mounting frame 30 via packing 32 with translucent cover portions 16 assembled to the body portions 25 via inner openings 33 of the lamp mounting frames 30.

According to the front module panel 11 of Embodiment 1 constructed as above, as the plurality of sensors 20-23 are arranged in different parts of the panel body 12, which is integrally molded of resin, there is no possibility that the relative positions of the sensors 20-23 may change as a result of vibration or deformation of the vehicle body. Therefore, it is possible to improve the accuracy of the information collected by the plurality of sensors 20-23, and it is also possible to allow the vehicle lamp ECUs 29 and the vehicle ECU to accurately determine, based on the combination of the information, the positions of persons, other vehicles, obstacles, etc., ahead of the vehicle body and appropriately control the light outputs of the head lamps 15 as well as the acceleration/deceleration of the vehicle and the actuation timing of the brake, etc.

In particular, as a single sensor, for example, a camera 20, and a vehicle lamp ECU 29 are built in each head lamp 15, which is fixedly disposed on the panel body 12, images shot by the camera 20 can be instantaneously processed by the vehicle lamp ECU 29, which is in the same location, so as to contribute to the safe driving during high-speed travel. Moreover, it is also possible to improve the ride quality of the automobile by accurately detecting the road conditions and the air pressures of the tires with the ultrasonic sensors 23 mounted on the lower edge of the front bumper portion 14, which is located close to the road surface, and controlling the steering and dampers.

Embodiment 2

As shown in FIG. 6, a rear door module panel 41 of Embodiment 2 is an exterior panel for being fitted to the rear surface of a vehicle body and has a panel body 42 made of resin. The panel body 42 includes an opaque rear door portion 43 that openably and closably covers an opening at the rear end of the vehicle body and a rear window portion 44 that is transparent to ensure a view behind the vehicle body, and the entire panel body is integrally molded of a synthetic resin material. A high-mount stop lamp 45 is provided at the upper edge of the rear door portion 43, and a camera 52 serving as a first sensor for shooting the scene behind the vehicle is provided in close proximity to the high-mount stop lamp 45. Provided at the lower edge of the rear door portion 43 is a LIDAR 53 for measuring the distance between an object behind the vehicle and the vehicle body.

A pair of right and left rear combination lamps 48 is installed in intermediate positions along the height of the panel body 42. A translucent cover portion 49 of each rear combination lamp 48 is two-color molded of a transparent resin material integrated with the panel body 42, and a body portion 50 of each rear combination lamp 48 is assembled to the panel body 42 in the position corresponding to the translucent cover portion 49. Furthermore, a light source unit 51 is received inside the body portion 50, and a millimeter wave radar 54 serving as a second sensor for detecting objects behind and lateral to the vehicle body and a vehicle lamp ECU 55 for processing output signals of each of the sensors 52-54 is also installed inside the body portion 50. It should be noted that, during autonomous driving of the vehicle, the high-mount stop lamp 45 can be lit in a different color (green, for example) from during halt so as to function as an indication lamp to signal autonomous driving.

According to the rear door module panel 41 of Embodiment 2, similar to Embodiment 1, as the plurality of sensors 52-54 are arranged in different parts of the integrally molded panel body 12, the relative positions of the sensors 20-23 can be kept constant at all times, and the rear combination lamps 48 and display devices, etc., can be controlled with high accuracy by the vehicle lamp ECUs 55 and the vehicle ECU based on the accurate information collected from behind the vehicle. In particular, as two sensors, for example, the camera 52 and the LIDAR 53, are mounted on the upper and lower edges of the panel body 42, the heights of objects behind the vehicle can be accurately measured, for example, to prevent the roof portion of the vehicle body from scraping in a parking tower garage, etc.

In the rear door module panel 41 shown in FIG. 7 and FIG. 8, a first region 46 having a relatively high transmittance of visible light and a second region 47 having a relatively low transmittance of visible light are defined in the rear window portion 44, with a plurality of sensors 57-60 arranged on the cabin side of the second region 47, including a camera serving as a first camera and an infrared sensor, etc., serving as a second sensor. A pigmented layer 61 having a transmittance of visible light of, for example, 10% or less is provided on the second region 47 to make the sensors 57-60 less visible from behind the vehicle body. A thin film capable of selectively transmitting wavelengths of light, including a film that contains particles of ITO (indium tin oxide), APO (amorphous polyolefin), and ATO (antimony trioxide), etc., a metal/titanium oxide film, and a dielectric multilayer, etc., can be used as the pigmented layer 61.

In this way, the pigmented layer 61 hides the sensors 57-60 from view from the outside to enhance the appearance of the rear door module panel 41. By using a material in the pigmented layer 61 that reflects infrared light, temperature rise in the second region due to sunlight can be limited so as to allow the sensors to stably operate for extended periods. Additionally, a material that reflects ultraviolet light can be used to extend the lives of the sensors, and wavelengths that cause noise in the sensors can also be reflected off to enhance the sensitivities of the sensors. Moreover, a thermochromism material, such as vanadium oxide ($VO_2$), etc., whose light transmittance changes due to the outside air temperature, may also be included in the second region 46 of the rear window portion 44 so as to enhance the light transmittance of the second region 47 when the outside air temperature is low at night or in cloudy weather, etc.

The present invention is not limited to the foregoing embodiments but can still be carried out with the shapes and configurations of various parts altered, without departing from the spirit of the present invention, for example, by installing a plurality of sensors in right and left door panels of a vehicle body, and installing sensors at the front and rear of a roof panel at the top surface of the vehicle body.

EXPLANATION OF REFERENCE NUMERALS

11 Front module panel (Example 1)
12 Panel body
13 Front grille portion
14 Front bumper portion
15 Head lamp 16 Translucent cover portion
20 Camera
21 Millimeter wave radar
22 LIDAR
23 Ultrasonic sensor
29 Vehicle lamp ECU
41 Rear door module panel (Embodiment 2)
42 Panel body
43 Rear door portion
44 Rear window portion
48 Rear combination lamp
49 Translucent cover portion
52 Camera
53 LIDAR
54 Millimeter wave radar
55 Vehicle lamp ECU

The invention claimed is:

1. A vehicle exterior panel for covering part of an external surface of a vehicle body, characterized by a first sensor and a second sensor for collecting information from around the vehicle body are arranged in different parts of a panel body integrally molded of a synthetic resin material:
   wherein the panel body includes a rear door portion for covering a rear surface of the vehicle body and a transparent rear window portion; and
   wherein the transparent rear window portion includes a first region having a relatively high transmittance of visible light and a second region having a relatively low transmittance of visible light, the first sensor and/or the second sensor being attached to a cabin side of the second region.

2. The vehicle exterior panel of claim 1, wherein a vehicle lamp for illuminating surroundings of a vehicle are fixedly mounted to each of both ends of the panel body.

3. The vehicle exterior panel of claim 2, wherein translucent cover portions of the vehicle lamps are integrally molded of a transparent synthetic resin material on both ends of the panel body.

4. The vehicle exterior panel of claim 3, wherein an electronic control unit is mounted on each vehicle lamp for controlling light output of the vehicle lamp based on the information collected by the first and second sensors.

5. The vehicle exterior panel of claim 3, wherein either the first or second sensor is built in each vehicle lamp.

6. The vehicle exterior panel of claim 2, wherein an electronic control unit is mounted on each vehicle lamp for controlling light output of the vehicle lamp based on the information collected by the first and second sensors.

7. The vehicle exterior panel of claim 2, wherein either the first or second sensor is built in each vehicle lamp.

8. The vehicle exterior panel of claim 1, wherein the panel body includes a front grille portion for covering a front surface of the vehicle body and a front bumper portion that extends in the direction of a vehicle width below the front grille portion.

9. The vehicle exterior panel of claim 1, wherein the second region includes a thermochromism material that changes the light transmittance of the second region due to an outside air temperature.

* * * * *